United States Patent [19]

Chatfield

[11] 3,779,910
[45] Dec. 18, 1973

[54] LIQUID TREATMENT PLANT AND PROCESS, PARTICULARLY FOR WASTE WATER

[75] Inventor: James E. Chatfield, Beaconsfield, Quebec, Canada

[73] Assignee: Canadair Limited, St. Laurent, Montreal, Quebec, Canada

[22] Filed: Feb. 14, 1972

[21] Appl. No.: 225,937

[30] Foreign Application Priority Data
Apr. 13, 1971  Canada .................................. 110150

[52] U.S. Cl. .................... 210/49, 210/195, 210/208
[51] Int. Cl. ............................................ B01d 21/16
[58] Field of Search .................... 210/195, 197, 261, 210/207, 208, 7, 83, 84, 521, 522, 49

[56] References Cited
UNITED STATES PATENTS

| 3,635,346 | 1/1972 | Zuckerman et al. | 210/208 |
| 2,076,529 | 4/1937 | Durdin | 210/197 |
| 2,901,114 | 8/1959 | Smith et al. | 210/7 |

Primary Examiner—Frank A. Spear, Jr.
Assistant Examiner—Benoit Castel
Attorney—Arnold B. Christen et al.

[57] ABSTRACT

A treatment process and plant particularly adapted to be embodied in a compact package unit designed in particular to efficiently remove phosphorus and other pollutants from waste water. A treatment process wherein lime or other chemical coagulant is intimately mixed with an influent solution to coagulate the solute and to flocculate the suspended particles into a flocculation chamber wherein the mixture is subjected to raising through a field of suspended particles and to reseeding with deposited particles to encourage the flocculation. Thereafter, the mixture is caused to pass through curtains of falling floc and between sedimentation trays to deposit the particles. The unit is constructed and arranged to produce gravity flow serially and at predetermined individual velocities through the successive stages of the process to optimize the flocculation and deposition conditions therein.

4 Claims, 3 Drawing Figures

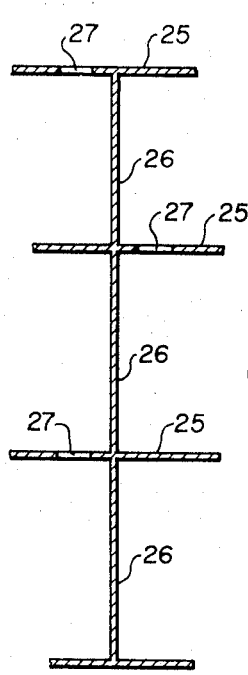
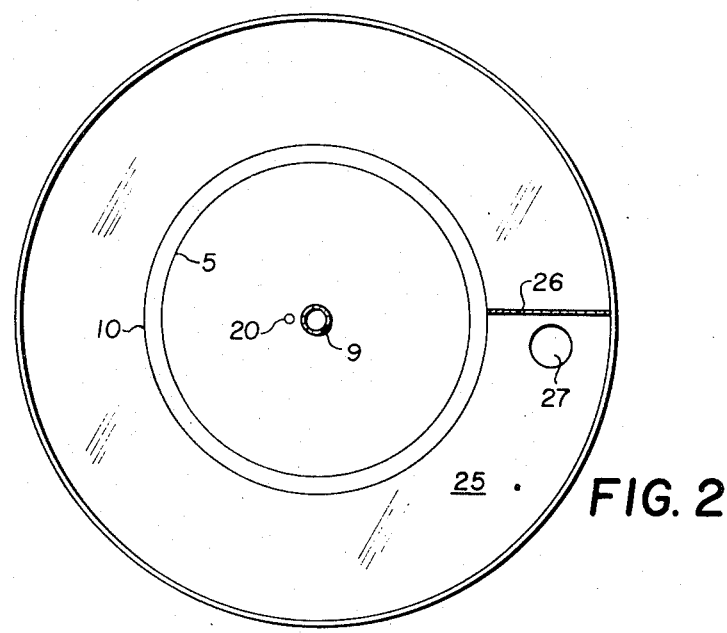
FIG. 3
FIG. 2

LIQUID TREATMENT PLANT AND PROCESS, PARTICULARLY FOR WASTE WATER

This invention relates to purifying treatment and unit for a solution and more particularly, to a waste water treatment process and to a plant or unit therefor.

Many factors or principles favorably influence the efficiency of the treatment of waste water. Such favorable factors include appropriate residence times in the mixing and flocculation zones or chambers, thorough mixing of the coagulating chemical with the waste water, the passing of the waste water through fields, beds or blankets of suspended particles, reseeding deposited sludge particles into the flocculation zone or chamber, and passing the waste water through falling floc and between sedimentation trays. It is found that the same factors also apply to the purifying of other solutions.

The waste water treatment plants of the type using chemical coagulation which have been proposed and operated so far, do not draw maximum advantages from the above factors or principles. The known waste water treatment processes and plants are essentially constructed to use only some but not all the above principles. Nobody so far has been able to embody the above principles in a single operative unit to obtain maximum benefits from the available know-how in this field.

It is a general object of the present invention to combine into a single and compact unit, the above-mentioned factors or principles to optimize the purifying treatment efficiency.

It is another general object of the invention to provide a single compact unit to effect purifying treatment of a solution and in particular waste water.

It is a further general object of the invention to provide a compact package purifying unit which has a minimum number of submerged movable parts and which is of simple construction, maintenance and operation.

It is further general object of the invention to provide a purifying treatment unit and process including various steps in which the individual throughflow velocities and the residence times of the waste water or other solution are predetermined to give the best possible results.

It is a further general object of the invention to provide a waste water treatment unit and process particularly adapted to remove phosphorus from waste water.

It is another general object of the invention to provide a purifying treatment process and unit wherein the throughflow is produced by the gravity action.

It is a more specific object of the invention to provide a purifying treatment unit or plant including compactly nested enclosures and partitions suitably arranged relative to each other to form an up-and-down tortuous flow path forming the desired treatment chambers or zones.

It is a further specific object of the invention to provide a waste water treatment unit having chambers suitably arranged and shaped to produce the desired individual velocities of flow and residence times of the waste water therein.

The invention will now be defined with reference to the accompanying drawings which schematically illustrate, by way of example only, a waste water treatment unit, according to a preferred embodiment of the invention.

FIG. 2 is a plan section view taken along line 2—2 in FIG. 1;

FIG. 3 is a fragmentary cross sectional elevational view taken along line 3—3 in FIG. 1;

Figure 1:
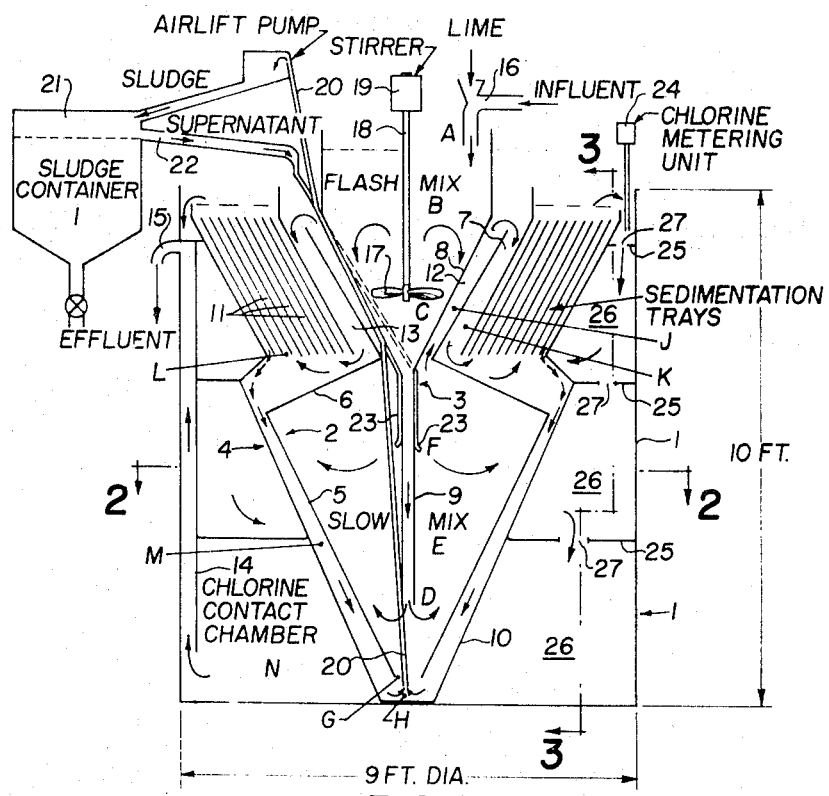
FIG. 1 is a cross sectional elevation view taken through the central vertical axis of the unit.

The preferred embodiment of the invention which will now be described in detail is particularly applied to the treatment of waste water but the same treatment unit and process may also be used for the purification of other solutions with or without the use of a chemical coagulant.

When certain chemicals, such as lime and ferric chloride, are added to the waste water, they coagulate the soluble phosphorus to form insoluble chemical compounds. Onto the particles formed by this chemical action, other substances in the waste water flocculate. These include the BOD or biological oxygen demand, and the COD or chemical oxygen demand. Removal of the BOD, COD and phosphorus from the waste water is then a function of removing the flocculated substances. In order to achieve high removal efficiencies, the proposed process includes special steps to ensure effective mixing adequate flocculation, and efficient sedimentation, as will be explained in detail later after the following description of the illustrated waste water treatment unit.

The illustrated compact package unit includes an outside enclosure 1 of preferably cylindrical shape enclosing basically three interior enclosures 2, 3 and 4 nested one within the other as illustrated and defined hereinafter. The enclosure 2 has a sidewall enclosing a flocculation chamber and including an open-ended downwardly tapering bottom conical portion 5, an open-ended upwardly tapering top conical portion 6 fixed end to end onto said bottom conical portion 5, and an upwardly diverging conical partition 7. The enclosure 3 includes a funnel shaped sidewall having a top hopper portion 8 and a depending discharging tube portion 9 extending near the bottom of the flocculation chamber defined by the enclosure 2. The enclosure 4 has a sidewall forming a downwardly tapering portion 10 surrounding the bottom conical portion 5 in spaced apart relationship therewith and has a closed bottom end to form a sludge collector, as will be better explained later. The upper end of the enclosure 4 diverges upwardly and contains a plurality of sedimentation trays 11 of truncated conical shape nested in radially spaced apart relationship. It must be noted that the upwardly diverging conical partition 7 extends intermediate the innermost sedimentation tray 11 and the top hopper portion 8 to define an extension 12 of the flocculation chamber and a downflow passage 13 leading to the lower end of the sedimentation trays 11. An upright baffle plate 14 is fixed against the interior surface of the outside enclosure 1 and forms an upward flow passage which is opened at the bottom into the contact chamber and which forms an overflow 15 at the top for the treated effluent.

A chemical and waste water influent supply pipe 16, as schematically illustrated in FIG. 1, is arranged to supply waste water and a metered quantity of a coagulating chemical, in any well known manner, into the mixing chamber defined by the top conical hopper portion 8.

A stirrer including an impeller 17, a drive shaft 18, and a motor 19 is provided to adequately mix the coagulant with the waste water influent. The impeller 17 is arranged to leave a predetermined restricted passage therearound into the mixing chamber and is rotated in a direction to upwardly impel or lift the waste water influent and chemical to retard or counter the normal downward flow thereof whereby to attain a predetermined residence time and mixing of the waste water into the mixing chamber.

The deposited sludge at the bottom of the downwardly tapering portion 10 is lifted upwardly into a pipe 20 by an ar lift or any othe suitable pump not sown but as known in the art. The sludge is accumulated into a sludge container 21 where the supernatant thereof is allowed to overflow into the recirculation pipe 22 and the outlet jets 23. The latter are arranged adjacent the upper part of the bottom conical portion 5 to produce reseeding, recirculation, and gentle tumbling and mixing of sludge particles therein.

A chlorine supply unit 24 of any suitable type is provided to supply metered quantity of chlorine, for instance sodium hyporchlorite, to effect bacterial treatment.

Into the contact chamber, there are arranged a limited number of vertically spaced apart horizontal baffles 25 defining superposed horizontal annular spaces. A vertical partition 26 extends between each pair of adjacent horizontal baffles 25. A hole or aperture 27 is provided through each horizontal baffle 25 adjacent the vertical partition 26. The holes or apertures 27 are staggered on opposites sides of the vertical partitions 26 from one baffle 25 to the other whereby the clarified waste water will enter into each annular space on one side of the corresponding partition, will flow circumferentially thereinto and will exit thereof on the other side of the same vertical partition.

The unit described and illustrated is operated by supplying waste water influent and the chemical coagulant into the mixing chamber formed by the top hopper portion 8. As aforementioned, the rotating impeller 17 lifts the wastewater and entrained chemical and thereby limits the downward flow of the latter which under the action of gravity flows downwardly around the impeller. There results an increased circulation and therefore mixing of the coagulant with the waste water and an extended residence time of the mixture in the mixing zone or chamber. Researchers have emphasized the need for an extended period of vigorous stirring prior to the flocculation stage. The process according to the present invention therefore includes a carefully designed mixing chamber and mixer so arranged that all the influent is adequately mixed for the required period of residence time and also so arranged that no short circuiting of the flow occurs.

The mixed coagulant and waste water, hereinafter called the waste water mixture, flows downwardly through the discharge tube portion 9 and exits therefrom adjacent the lower part of the bottom conical portion 5. There is little turbulence into the lower part of the conical portion 5, and the flocculation with appropriate upward flow velocity of the waste water mixture causes the formation of a field or blanket of suspended floc or particles through which the mixture rises resulting in an upward flow of partly clarified waste water mixture and a downward flow of heavier particles and a deposition of sludge at the bottom of the downwardly tapering portion 10.

As explained above, a pump removes the deposited sludge and accumulates the same into the sludge container 21 from which supernatant overflows and is recirculated into the waste water mixture by the outlets 23. The floc or particles in the supernatant assisted by the turbulence or circulation produced by the outlet jets 23, enhance flocculation of the free particles remaining suspended in the partly clarified waste water mixture. As the latter flows further upwardly, a second field or blanket of particles forms into the extension 12 of the flocculation chamber and there results a second clarifying stage or step.

The clarified waste water mixture thereafter flows downwardly through the passage 13 to arrive at the lower end of the nested conical sedimentation trays 11. The passage of the waste water mixture between the trays 11 results in deposition of particles onto the trays and dripping thereof along and at the lower end of the latter. There results the formation of a curtain or curtains of falling floc into the space at the bottom end of the trays 11 through which the waste water mixture is caused to flow before entering between the trays, thereby further enhancing the flocculation and the deposition of the floc. The latter falling or dripping from the lower end of the sedimentation trays 11 are collected by the downwardly tapering portion 10.

The clarified waste water mixture reaching the upper end of the sedimentation trays is allowed to overflow into the contact chamber where chlorine is added in metered quantity by a unit 24 to effect bacterial treatment. The passage defined by the upright baffle 14 allows overflow of the treated waste water or effluent after the aforementioned baffled flow through the contact chamber.

It must be pointed out that in the process according to the invention, flocculation is encouraged to take place, in six separate stages or steps including the creation of two distinct fields of suspended particles through which the flow is caused to pass, the reseeding or recirculation of deposited sludge into incoming waste water mixture, gentle tumbling or circulation thereof, and causing the flow to pass through specifically arranged curtains of falling floc before passing between the sedimentation trays. It should be noted that the combination of the above stages into a single unit is rendered possible by providing and arranging internal partitions and enclosures to obtain an up-and-down tortuous flow path and a throughflow under the action of gravity.

Normally, the removal of phosphate and other particles by a chemical such as lime is progressively increased by increasing the pH. By using recirculation of deposited particles, the whole process can be carried out at a pH substantially less than would otherwise be necessary. This saves on the amount of chemical required and may obviate the necessity of restoring the water to lower pH value before discharge.

Having used a chemical coagulant to bring the phosphorus out of solution in the mixing chamber, and having provided conditions which enhance or encourage the formation of floc, the following step for high efficiency treatment consists in the removal of these floc particles from the waste water mixture. The step of raising the waste water through a field or blanket of suspended particles acting as upflow clarifier, produces a high efficiency removal of suspended solids. Tray sedimentation further assists the upflow clarifier technique for high reliable efficiency.

The final step or stage in the process and unit according to the invention is chlorination in the contact chamber; satisfactory results may be obtained by careful dosage, proper mixing, suitable residence time and absence of short-circuited flow conditions.

It should also be noted that the relative cross-sectional areas of the various enclosures or passages for the waste water are predetermined to obtain optimum individual velocities of flow and residence times in the various distinct chambers and zones through which the flow is subjected to any particular step of the treatment process.

As briefly explained hereinbefore, the method and unit of the present invention are also adapted for the the purification of other solutions than waste water.

What I claim is:

1. A liquid purification process comprising serially flowing liquid containing impurities under gravity at predetermined relative velocities through stages including feeding a chemical coagulant to a waste water influent, stirring the latter with the chemical coagulant therein, into a flocculation chamber, to counter the normal flow to achieve extended residence time and reduced throughflow velocity of the waste water mixture through the mixing stage, funneling the waste water mixture to the bottom portion of the flocculation chamber, raising the mixture through one field of suspended particles, recirculating deposited sludge into the flocculation chamber to enhance flocculation into the latter, by pumping deposited sludge into the flocculation chamber, settling sludge to produce supernatant, causing sludge supernatant to flow into the flocculation chamber, and tumbling the waste water mixture, raising the mixture through another field of suspended particles, passing the mixture through curtains of falling floc and between sedimentation trays for the deposition of sludge and the formation of a clarified waste water mixture, chemically treating the latter to obtain satisfactory flocculation and sludge deposition conditions to produce a purified waste water effluent, and allowing said clarified waste water mixture to overflow.

2. A liquid purification process comprising serially flowing, under gravity, liquid containing impurities at predetermined relative velocities through stages including, feeding a chemical coagulant to a liquid influent, mixing the coagulant with the influent thereby forming a liquid mixture into a flocculation chamber, raising the mixture through at least one field of suspended particles and recirculating deposited sludge into the flocculation chamber by pumping deposited sludge above said flocculation chamber, settling sludge to produce supernatant, causing sludge supernatant to flow into the flocculation chamber, and tumbling the liquid mixture to enhance flocculation into the flocculation chamber, passing the mixture through curtains of falling floc and between sedimentation trays for the deposition of sludge and the formation of a clarified mixture, further chemically treating the latter, whereby to obtain satisfactory flocculation and sludge deposition conditions to produce a purified effluent, and allowing said clarified mixture to overflow under gravity action.

3. A liquid purification treatment plant comprising a unit including, constructed and arranged for serially flowing a liquid containing impurities therethrough at predetermined individual velocities, a first enclosure forming a flocculation chamber, a second enclosure forming a mixing chamber adapted to mix a chemical coagulant and influent to form a liquid mixture therewith and arranged to discharge and to cause raising of the latter into said flocculation chamber through a field of suspended particles formed into the latter, recirculating means arranged to recirculate and reseed deposited sludge particles into the flocculation chamber whereby to enhance flocculation into the latter, sedimentation trays nested adjacent said flocculation chamber, a passage means for the liquid mixture extending from said flocculation chamber to the bottom of said sedimentation trays to cause the liquid mixture from the flocculation chamber to flow through curtains of falling floc under said sedimentation trays and upwardly between the latter for the deposition of sludge and the formation of a clarified liquid mixture, and a third enclosure forming a contact chamber arranged adjacent said sedimentation trays for treating said clarified liquid mixture, said contact chamber being provided with an overflow for the effluent, said second enclosure being provided with a sidewall having an upper end portion extending higher than said overflow, said sedimentation trays having upper ends which are lower then said upper end portion of said sidewall whereby said liquid mixture is allowed to flow under gravity action from said mixing chamber and over said upper ends, to said overflow, said first and second enclosures and said sedimentation trays being nested inside said contact chamber, and said first, second and third enclosures having sidewalls constructed and arranged to produce an up-and-down tortuous flow path, said first enclosure having a sidewall having an openended downwardly tapering bottom conical portion and an openended upwardly tapering top conical portion, the sidewall of said second enclosure having a funnel shape defining a conical hopper portion and a depending discharge tube portion extending into said bottom conical portion and opening adjacent the bottom thereof, a fourth enclosure surrounding said first enclosure and being conically shaped to form a sludge collector around said bottom conical portion, said sedimentation trays being formed of downwardly tapering truncated conical surfaces nested in radially spaced apart relationship one within another and relative to said conical hopper portion and above said upwardly tapering top conical portion, an upright baffle plate being fixed inside said third enclosure and arranged to form an upward flow passage for said effluent leading from said contact chamber to said overflow, and a partition extending upwardly from the upper end of said top conical portion intermediate said conical hopper portion and said sedimentation trays.

4. A treatment plant for waste water as defined in claim 3, further including a stirring impeller rotatably mounted into said conical hopper portion and arranged upon rotation to counter downward flow therethrough; said recirculating means includes a recirculating and tumbling zone into said flocculation chamber, an airlift pump having a suction inlet positioned into the bottom of said fourth enclosure and arranged to suck deposited sludge particles into a sludge container above said flocculation chamber and a supernatant discharge pipe connected to said sludge container and having an outlet extending into said circulating and tumbling zone and arranged to feed supernatant into said zone to cause recirculation of deposited sludge particles.

* * * * *